United States Patent [19]
Cullen

[11] 4,454,440
[45] Jun. 12, 1984

[54] SURFACE ACOUSTIC WAVE (SAW) PRESSURE SENSOR STRUCTURE

[75] Inventor: Donald E. Cullen, Manchester, Conn.

[73] Assignee: United Technologies Corporation, Hartford, Conn.

[21] Appl. No.: 126,084

[22] Filed: Feb. 29, 1980

Related U.S. Application Data

[63] Continuation of Ser. No. 972,542, Dec. 22, 1978, abandoned.

[51] Int. Cl.³ .......................................... H01L 41/08
[52] U.S. Cl. ........................... 310/313 R; 310/313 B; 310/346
[58] Field of Search ............... 310/313 R, 346, 313 B, 310/313 C; 333/152, 155; 73/654, 674, 677, 678, 820, 825, 849, 855, 702, 715, 720, 721, 723, 729, 753, 754, 765, 766, 782, DIG. 4

[56] References Cited

U.S. PATENT DOCUMENTS

| | | | |
|---|---|---|---|
| 3,978,731 | 9/1976 | Reeder et al. | 310/338 X |
| 4,019,388 | 4/1977 | Hall et al. | 73/754 X |
| 4,216,401 | 8/1980 | Wagner | 310/313 R |

Primary Examiner—Mark O. Budd
Attorney, Agent, or Firm—Dominic J. Chiantera

[57] ABSTRACT

A surface acoustic wave (SAW) pressure sensor is mechanically supported within a vacuum sealing structure by a cylindrical metal sleeve which isolates the SAW sensor substrate from induced thermal strain resulting from temperature cycling of the structure, and which provides for a fluid conduit through the vacuum environment from the sensor diaphragm to an orifice formed through the wall of the structure.

2 Claims, 5 Drawing Figures

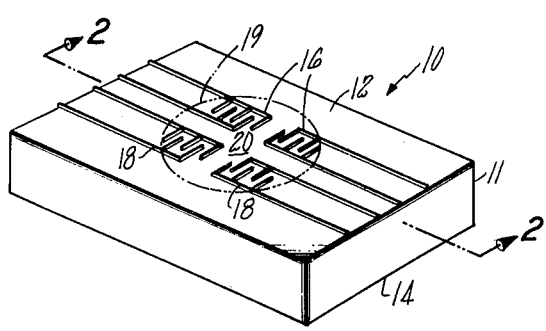
FIG. 1  PRIOR ART
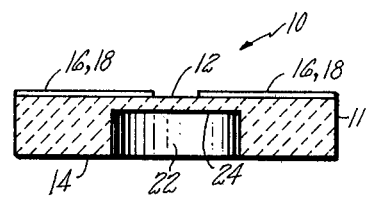
FIG. 2  PRIOR ART
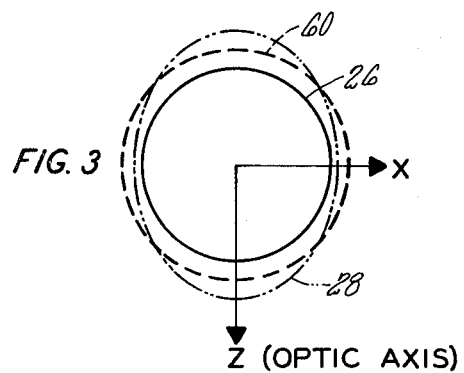
FIG. 3
FIG. 4
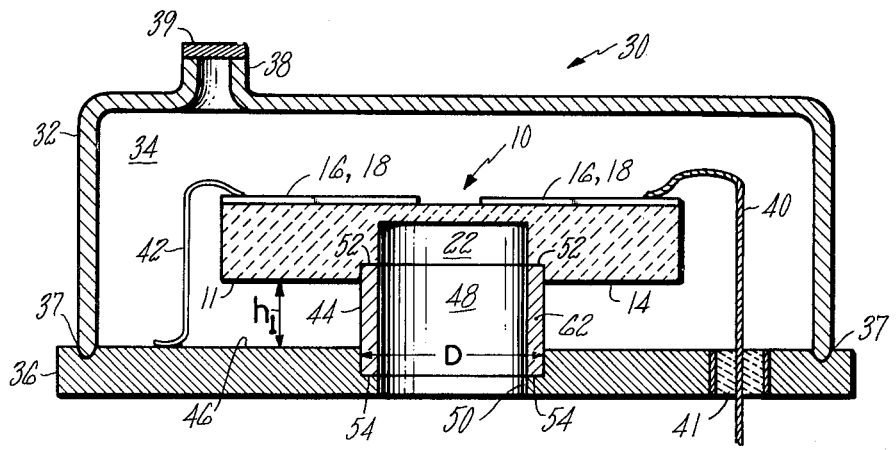

SURFACE ACOUSTIC WAVE (SAW) PRESSURE SENSOR STRUCTURE

This is a continuation of application Ser. No. 972,542 filed on Dec. 22, 1978, now abandoned.

BACKGROUND OF THE INVENTION

1. Field of the Invention

This invention relates to surface acoustic wave (SAW) pressure sensors, and more particularly to vacuum encapsulating structures therefor.

2. Description of the Prior Art

SAW pressure sensors are well known in the art, as reported in U.S. Pat. Nos. 3,978,731 and 4,100,811. Briefly stated, SAW delay lines which include a planar substrate having two major surfaces with electro-acoustic transducers disposed in an active signal region on one of the surfaces are adapted to provide SAW pressure sensors by forming a flexible, deformable diaphragm in the active signal region. The diaphragm is formed between the surface of the substrate which includes the active signal region and a parallel surface provided by the end wall of an interior cylindrical cavity, or bore, formed in the second major surface. The cavity acts as a fluid conduit to the interior surface of the diaphragm for applied pressure signals which apply stress to the diaphragm causing it to deform and change the acoustic wave propagation characteristics in the active signal region of the substrate. By connecting the SAW delay line to an external oscillator the change in acoustic wave propagation velocity may be measured as a change in the frequency of oscillation, all of which is disclosed in the hereinbefore referenced patents.

When used as absolute pressure sensing devices, the SAW pressure sensors must be vacuum encapsulated to provide zero psi on a reference surface of the diaphragm (the active signal region surface) while permitting access to the opposite surface of the diaphragm (the interior surface formed by the cavity end wall) for the sensed pressure signals. The encapsulating structure must also permit external electrical connection to the transducers of the delay line and, ideally, must not induce thermal strain in the SAW active signal region resulting from temperature cycling of the structure over the operating temperature range of the sensor. The requirement to prevent, or minimize induced thermal strain presents difficulties when there are different temperature coefficients of expansion between the SAW substrate material and the vacuum encapsulating material. The problem is particularly acute when the SAW substrate itself comprises piezoelectric material, such as quartz which has anisotropic temperature coefficients of expansion. One structure which satisfies all of the requirements, especially that of minimizing induced strain, is described in a commonly owned, copending application of the same assignee entitled VACUUM ENCAPSULATION FOR SURFACE ACOUSTIC WAVE (SAW) DEVICES, U.S. Ser. No. 945,359, filed on Sept. 25, 1978 by D. E. Cullen and R. A. Wagner, wherein the vacuum structure is formed from the same crystal material comprising the substrate, which results in identical expansion characteristics over temperature and which is electrically insulative permitting a bond of the structure directly across the transducer conductors. As a result, the active signal region is maintained in a vacuum while the opposite surface of the diaphragm is readily accessible to the sensed pressure signals. There are many instances, however, where a metal vacuum structure would be preferred due to the operating environment. While suitable metal packaging techniques are available for providing the electrical interconnection to the transducers, the combination of the dissimilar materials, i.e. metal and crystal, results not only in induced strain in the SAW sensor diaphragm but, for piezoelectric substrates with anisotropic temperature characteristics, the strain may become so severe as to cause the rupture of the vacuum seal of the structure to the substrate. At the present time this provides a definite limitation on both the accuracy and the maximum operating temperature range of metal encapsulated SAW pressure sensors.

SUMMARY OF THE INVENTION

Objects of the present invention include providing an encapsulating structure for maintaining a SAW pressure sensor in a vacuum environment over an extended temperature range of operation and for isolating the SAW sensor diaphragm from induced thermal strain resulting from temperature cycling of the structure over the same range of temperature.

According to one aspect of the present invention, the SAW pressure sensor is supported in a vacuum environment within a vacuum sealing structure by a cylindrical metal sleeve which displaces the sensor from a mounting wall of the structure at a distance ten to twenty times greater than the value of the cylinder wall thickness, the sleeve being disposed at one end in a vacuum sealing relationship to the cavity opening in the SAW substrate and being disposed at the other end in a vacuum sealing relationship to an orifice formed through the mounting wall of the structure, the sleeve providing a fluid conduit for external pressure signals through the vacuum environment from the orifice to the interior surface of the SAW diaphragm. According to another aspect of the present invention the sleeve diameter is at the minimum value required to support the sensor over the operating range of vibration frequencies. According to still another aspect of the present invention the sleeve is comprised of a metal having a temperature coefficient of expansion which is intermediate to that of the anisotropic temperature coefficients of a piezoelectric SAW substrate. In further accord with the last aspect, the sleeve comprises a metal having good vacuum characteristics, including low vapor pressure, high melting point, corrosion resistance, is easily outgassed, may be machine formed, and which may be soldered, welded, or brazed, such as nickel.

The vacuum encapsulating structure of the present invention provides a minimum vacuum of $10^{-6}$ torr over an extended temperature range on the order of 200° C. The structure provides for isolation of the SAW substrate to minimize the induced strain into the substrate resulting from temperature cycling of the vacuum structure over the operating temperature range of the sensor.

These and other objects, features and advantages of the present invention will become more apparent in the light of the following detailed description of preferred embodiments thereof, as illustrated in the accompanying drawing.

BRIEF DESCRIPTION OF THE DRAWING

FIG. 1 is a perspective view of a prior art SAW pressure sensor, as may be used in the present invention;

FIG. 2 is a simplified, sectioned side elevation view of the SAW sensor of FIG. 1;

FIG. 3 is a simplified illustration of one thermal expansion characteristic of the SAW pressure sensor structure of the present invention;

FIG. 4 is a simplified, sectioned side elevation view of one embodiment of a vacuum encapsulated SAW pressure sensor structure according to the present invention.

DETAILED DESCRIPTION

Figure 5:
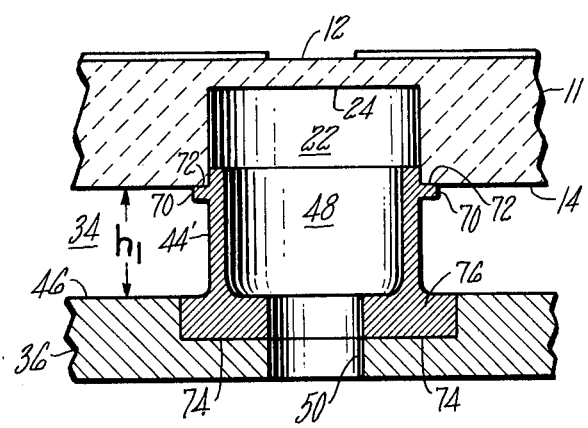
FIG. 5 is a simplified, partial sectioned side elevation view of an alternative embodiment of the SAW pressure sensor structure shown in FIG. 4.

Referring now to FIGS. 1 and 2, a SAW pressure sensor 10 of the type disclosed in U.S. Pat. No. 4,100,811 includes a planar substrate 11 having first and second major surfaces 12, 14. Pairs of electro-acoustic transducers 16, 18 are disposed on the first surface in the active signal region 19 which also includes the deformable diaphragm 20 formed in the substrate by a cylindrical cavity, or bore, 22 of diameter $d_0$. The thickness of the diaphragm is measured between the first surface 12 and the interior surface 24 formed in the substrate by the end wall of the cavity 22. The diaphragm 20 flexes in response to pressure on the surface 24 from a fluid presented into the cavity.

Typically, the substrate is comprised of piezoelectric material, although piezoelectric material such as zinc oxide may be deposited in a form of a thin-film coating between the transducers 16, 18 and the first surface 12. If piezoelectric, the substrate may comprise any of the known piezoelectric materials including quartz, lithium niobate or lithium tantalate. Of these quartz is the most widely used because of its availability and lower cost. The quartz has anisotropic temperature coefficient characteristics, the optic or Z axis having a temperature coefficient of expansion which is on the order of twice that in either of the X or Y axes. The quartz substrate is cut from a bulk quartz crystal in any one of a number of known crystallographic orientations, such as a Y-cut or a ST-cut wafer, depending on the particular SAW device application. For Y-cut quartz the 25° C. temperature coefficient of expansion in the Z axis is on the order of $13.7 \times 10^{-6}$(in/in—°C.) and in the X axis, the axis of the SAW propagation, it is on the order of $7.5 \times 10^{-6}$(in/in—°C.) As a result of the anisotropic temperature characteristics the cylindrical cavity 22 deforms over the operating range of temperatures in a generally elliptical fashion, as shown in FIG. 3. The illustration of FIG. 3 is exaggerated for teaching purposes to demonstrate the nature of the deformation, where a circle 26 represents the shape of the cavity at room temperature which deforms with increasing temperature to a geometry which is substantially elliptical as illustrated in phantom by the ellipsoid 28, the major axis of the ellipsoid being along the Z axis of the crystal wafer.

Referring now to FIG. 4, in a vacuum encapsulated SAW pressure sensor structure 30 according to the present invention, the SAW sensor 10 is encapsulated by a vacuum enclosure comprising a cover portion 32 adapted to enclose the sensor 10 within a chamber 34 formed by the cover 32 and a base portion 36. The cover and base are formed from vacuum type material, whether metal or glass, suitable for providing a minimum vacuum of $10^{-6}$ torr within the chamber 34. The cover is bonded to the base along the mating surface 37 with a vacuum seal, such as a solder seal, or weld. The cover 32 includes a small orifice 38 which allows evacuation of the chamber 34 following the bonding of the cover to the base, after which the orifice is closed off with a solder seal 39.

The electrical connections between the SAW transducers 16, 18 and the external oscillator circuits (not shown) are provided through electrical conductors 40 which are mounted through the base 36 with feed-thru insulators 41, of a type known in the art, which provide both electrical insulation of the conductor and a vacuum seal between the chamber 34 and the outside ambient. For a metal vacuum enclosure the base itself may be used as the return current path for the transducer and internal ground wires 42 may be provided between the SAW transducers and the base.

The SAW sensor 10 is supported in the chamber by a cylindrical metal sleeve 44 which displaces the sensor substrate 11 at a distance, or height ($h_1$) above the inside surface 46 of the base. The sleeve has a diameter (D) which is equal to or less than the diameter of the cavity 22. The sleeve aperture 48 provides a fluid passage, or conduit, between the cavity and an orifice 50 formed through the wall of the base and accessible to an external source of pressure signals (not shown). In FIG. 4 the metal sleeve 44 is illustrated as a straight walled cylinder having a bearing surface 52 adapted to fit into a counterbore formed in the substrate 11 along the circumference of the cavity opening in the substrate 11, and having a seating surface 54 adapted to fit into a similar type counterbore provided in the surface 46 along the circumference of the orifice 50. Each of the sleeve surfaces are bonded to their respective mating surfaces by a solder seal. In assembly of the structure the sleeve is first sealed to the substrate. Following a step of RF sputtering thin-films of chrome and gold to the side wall of the counterbore, a plating of nickel is applied to the gold film and the bearing surface 52 is soldered in the counterbore with a lead tin solder having a melting point of approximately 200° C. At a later step the seating surface is soldered to the base with a lower temperature indium solder having a melting point temperature of 156° C. Each of the solder bonds provide a vacuum seal of the substrate and base to the mating surfaces of the sleeve.

The metal sleeve comprises a vacuum type metal having good vacuum characteristics, such as: low vapor pressure, high melting point, corrosion resistance, may be easily outgassed, may be formed by machining, and may be soldered, welded, or brazed. To prevent the rupture of the vacuum seal between the sleeve and the substrate, the metal must also be of a type having a temperature coefficient of expansion which is compatible to that of the substrate. For the piezoelectric material substrates having anisotropic temperature characteristics the metal should have a temperature coefficient between those of the optic axis and the X and Y axes. This allows the sleeve expansion to expand, as illustrated in FIG. 3, from the solid circle 26 to the dashed circle 60 while the cavity expands from the circle 26 to the ellipsoid 28. The sleeve expands less along the Z axis than the substrate but more along the X axis, providing an approximate mean expansion to that of the two axes of the substrate.

This expansion of the sleeve beyond the substrate in the X axis, if permitted, would result in strain being induced into the substrate, and possibly fractures along the interior surface of the cavity. If, however, the metal sleeve deforms such that the cylinder walls yield to the restricted expansion of the sleeve along the substrate X axis, the sleeve will follow the elliptical distortion characteristic of the substrate cavity, reducing or even eliminating the induced strain and maintaining the integrity of the vacuum seal. Of course, the sleeve must exhibit an elastic deformation allowing restoration of the sleeve contour at room ambient along with the restoration of the cavity. Therefore, in addition to the requirements that the sleeve comprise a metal which is suitable for providing a vacuum seal, i.e. high vapor pressure, it must have a temperature coefficient which is between that of the anisotropic characteristics of the quartz and must also exhibit an elastic deformation characteristic. One metal which satisfies all of these requirements is nickel which has a 25° C. temperature coefficient of $12.6 \times 10^{-6}$(in/in$-°$ C.). Nickel exhibits an inherent elastic deformation characteristic and through suitable sleeve geometry, including wall thickness, sleeve length, and sleeve diameter, the sleeve may be made to exhibit the deformation required to conform in concert with the quartz substrate over the operating temperature range of the sensor.

The deformation may be provided by selecting a length for the sleeve which ensures that the substrate 11 is displaced from the base interior surface 46 at a height ($h_1$) which is ten times greater than the thickness of the cylinder walls 62, which are formed to a minimum dimension. The minimum wall thickness is selected with consideration given to: providing the sleeve structure with sufficient rigidity to prevent deformation of the sleeve cylindrical shape under a maximum pressure differential between sensed pressure and the zero psi of the chamber 34, and providing a vacuum tight seal over the same operating range of sensed pressures, i.e. that the cylinder walls do not become so thin as to exhibit a porosity which may provide for a vacuum leak. A minimum dimension for the cylinder wall thickness for a 50 psi sensor is in the range of 0.002 to 0.003 inches. A more conservative value of wall thickness for the same sensor is on the order of 0.005 inches, which then establishes the height ($h_1$) as 0.050 inches. The additional length of the sleeve beyond that of the height dimension is selected to provide a suitable insertion length of the sleeve into each of the counterbores for the cavity 22 and orifice 50.

Establishing the 10:1 ratio between the height and the wall thickness provides the sleeve with sufficient elasticity to allow the bearing surface 52 and the adjacent top portion to deform in cooperation with the cavity, however, the dissimilar temperature coefficients still produce dimensional differences in expansion. The solder seal along the surface 52 exhibits sufficient elasticity to maintain the vacuum seal despite the slight dissimilarities in deformation. To provide the minimum displacement the sleeve diameter (D) is selected at the minimum value possible. This is limited by two constraints. The first constraint is the diameter of the cavity 22 since the outer diameter of the sleeve cannot be less than that of the opening of the cavity at the substrate surface. As illustrated in FIG. 4, the cavity diameter is equal to that of the diaphragm since the diaphragm (20, FIG. 1) is formed by boring the cavity into the substrate second surface. If alternative methods can be found to provide the required diaphragm diameter the diameter of the remaining part of the cavity, i.e. that part opening at the surface 24, can be narrower and still provide for fluid communication from the orifice 50 to the diaphragm surface 24, such that the sleeve diameter may be smaller than that of the diaphragm itself. The second constraint is that the sleeve must provide the required rigid support of the substrate mass. The substrate/sleeve mounting is in the nature of a pedestal which may vibrate under sensor operating conditions. If the vibration, or oscillation, is severe enough it may result in a tearing away of the substrate from the sleeve surface 52 resulting in a vacuum leak, or a break in the electrical connections provided to the SAW transducers. A minimum diameter which satisfies the mechanical support requirements is on the order of one quarter of the maximum dimension of the rectangular substrate of FIG. 1. If a circular substrate is used the sleeve diameter is on the order of one quarter that of the substrate. Since the diaphragm diameter is typically one half that of a circular substrate, or one half the maximum dimension of a rectangular substrate, the minimum diameter for the sleeve 44 is on the order of one half the diameter of the diaphragm.

In summary, the metal sleeve 44 has the characteristics of: (1) comprising a vacuum type metal having a temperature coefficient of expansion compatible with that of the anisotropic characteristics of the SAW substrate material, (2) has as an overall length to wall thickness which provides for displacement of the substrate from the enclosure base at a distance which is ten times greater than the wall thickness of the sleeve, and (3) and has a sleeve diameter which is equal to or less than the diameter of the diaphragm formed in the SAW substrate, and which has an optimum minimum diameter equal to one half that of the diaphragm. As long as these requirements are satisfied, the sleeve may have a slightly altered geometry to satisfy alternative mounting requirements of the sleeve to both the substrate and the orifice formed in the wall, such as the base 46, of the vacuum structure.

Referring now to FIG. 5, in an alternative embodiment the sleeve 44' includes a rim, or flange, 70 formed around the outer surface of the cylindrical wall. The rim provides a bearing surface 72 for supporting the substrate 11 at the height ($h_1$) above the surface 46 of the base 36. In this manner, the substrate 11 need not have the counterbore formed along the circumference of the cavity, which may be preferred. The sleeve 44' comprises the same material as that of the sleeve 44, having the same requirements of providing a vacuum seal and an elastic deformation characteristic such that the sleeve conforms to the deformation of the aperture over temperature. The sleeve provides for a similar fluid conduit 48 between the orifice 50 and the cavity 22 allowing for fluid communication between an external source of pressure signals and the surface 24 of the diaphragm formed in the substrate. The sleeve 44' also has a seating surface 74 which mates with a countersink in the base 36 of the enclosure. In FIG. 5, the seating surface is provided by a shoulder portion 76 of the sleeve which permits both for enhanced mechanical strength of the sleeve at the seating surface and also for a reduction in the diameter of the orifice 50 formed in the base. This allows for practical considerations in both providing the thin-walled sleeve with sufficient rigidity for handling, i.e. to prevent distortion of the sleeve during fabrication which may result for sleeves having the minimum wall thickness, and also for providing an opening at the orifice which is compatible to standard size pressure fittings, such that the orifice and/or the interior wall of the shoulder 76 may be threaded to an external fluid conduit. Since the sleeves 44 and 44' each have temperature coefficients which are compatible with the metal enclosure there is no requirement that the sleeve exhibit unusual deformation along the seating surface. Any incidental differences in temperature coefficients which may induce strain in the base 36 do not provide any induced strain in the substrate. Therefore, the sleeve 44 shown in FIG. 4 may similarly be provided with the shoulder 76 illustrated for the sleeve 44' while the bearing surface 52 of the sleeve 44 remains the same.

The vacuum encapsulated SAW pressure sensor structure of the present invention provides for both the tight vacuum encapsulation of the SAW substrate to prevent the deterioration or change in propagation velocity due to ambient contamination while also providing the required zero psi reference for an absolute pressure sensor configuration. The use of the metal sleeve to support the substrate at a displaced dimension from the wall of the structural enclosure isolates the SAW substrate from any induced strain resulting from temperature cycling of the structure over the temperature range of operation. The sleeve geometry including length, wall thickness, and diameter may be altered within the guidelines recited hereinbefore to provide for higher operating temperature ranges, such that a minimum wall thickness in the range of 0.002 to 0.003 inches for a sensor having a maximum pressure differential of 50 psi must be increased to satisfy higher pressure differentials. For a six hundred psi sensor, the minimum wall thickness is on the order of 0.003 to 0.004 inches with a typical thickness on the order of 0.008 inches. The preferred material for the metal sleeve is nickel, although any material having the requisite characteristics described hereinbefore may be used. Similarly, although the invention has been shown and described with respect to illustrative embodiments thereof, it should be understood by those skilled in the art that the foregoing and various other changes, omissions and additions in the form and detail thereof may be made therein without departing from the spirit and the scope of the invention.

Having thus described typical embodiments of my invention, that which I claim as new and desire to secure by Letters Patent is:

1. A surface acoustic wave (SAW) pressure sensor structure, comprising:
   a SAW pressure sensor including a SAW delay line disposed in an active signal region on a first one of two parallel major surfaces of a substrate, said substrate having a deformable diaphragm formed therein coextensive with said active signal region, said diaphragm having a membrane thickness determined by the relative displacement of said first surface from a parallel interior surface defined by the end wall of a cylindrical cavity formed in the second major surface of said substrate,
   a vacuum sealing enclosure including a base portion and a cover portion joined in a vacuum sealing relationship and adapted to receive said SAW sensor in a vacuum chamber formed therebetween, said base portion including an orifice therethrough adapted for alignment with said cavity in said substrate; and
   a cylindrical metal sleeve having a central aperture formed along the length thereof and joined in a vacuum sealing relationship at opposite ends thereof to said cavity and to said orifice for providing a fluid conduit for external pressure signals through said vacuum environment from said orifice to said cavity, said sleeve supporting said SAW pressure sensor in displacement from said base portion at a distance which is from ten to twenty times greater than the wall thickness of said sleeve.

2. The structure of claim 1, wherein said SAW substrate comprises quartz, and wherein said metal sleeve comprises material having a temperature coefficient of expansion which is intermediate to the anisotropic temperature coefficients of expansion of said quartz substrate.

* * * * *